US011066095B2

(12) United States Patent
Kodera et al.

(10) Patent No.: US 11,066,095 B2
(45) Date of Patent: Jul. 20, 2021

(54) CONTROLLER FOR STEERING SYSTEM AND METHOD FOR CONTROLLING STEERING SYSTEM

(71) Applicants: JTEKT CORPORATION, Osaka (JP); TOYOTA JIDOSHA KABUSHIKI KAISHA, Toyota (JP)

(72) Inventors: Takashi Kodera, Okazaki (JP); Masayuki Kita, Okazaki (JP); Toru Takashima, Susono (JP); Tetsuya Morino, Susono (JP)

(73) Assignees: JTEKT CORPORATION, Osaka (JP); TOYOTA JIDOSHA KABUSHIKI KAISHA, Toyota (JP)

(*) Notice: Subject to any disclaimer, the term of this patent is extended or adjusted under 35 U.S.C. 154(b) by 169 days.

(21) Appl. No.: 16/546,517

(22) Filed: Aug. 21, 2019

(65) Prior Publication Data

US 2020/0062294 A1    Feb. 27, 2020

(30) Foreign Application Priority Data

Aug. 23, 2018   (JP) .............................. JP2018-156288

(51) Int. Cl.
*B62D 5/00* (2006.01)
*B62D 6/02* (2006.01)
*B62D 5/04* (2006.01)

(52) U.S. Cl.
CPC ............. *B62D 5/008* (2013.01); *B62D 5/046* (2013.01); *B62D 6/02* (2013.01)

(58) Field of Classification Search
None
See application file for complete search history.

(56) References Cited

U.S. PATENT DOCUMENTS

| 7,406,374 B2* | 7/2008 | Ono | B62D 6/003 |
| | | | 180/197 |
| 8,843,276 B2* | 9/2014 | Kojo | B62D 5/008 |
| | | | 701/41 |

(Continued)

FOREIGN PATENT DOCUMENTS

| EP | 1 602 559 A2 | 12/2005 |
| JP | 2006-056448 A | 3/2006 |
| JP | 2018-111425 A | 7/2018 |

OTHER PUBLICATIONS

Mar. 10, 2020 Extended Search Report issued in European Patent Application No. 19192544.5.

*Primary Examiner* — Michael A Berns
(74) *Attorney, Agent, or Firm* — Oliff PLC

(57) ABSTRACT

A controller includes a control circuit configured to calculate a target corresponding steered angle that is a target value of a corresponding steered angle based on the transmission ratio associated with the vehicle speed. The corresponding steered angle is a rotation angle of a rotation shaft, which is convertible to the steered angle whose magnitude is changed relative to a value indicating the steering angle. The control circuit is configured to control the actuation of the motor so that an actual corresponding steered angle is a final target corresponding steered angle that is based on the target corresponding steered angle. The control circuit is configured to calculate the target corresponding steered angle by adjusting the transmission ratio based on a value indicating acceleration or deceleration of a vehicle.

4 Claims, 6 Drawing Sheets

(56) References Cited

U.S. PATENT DOCUMENTS

| | | | |
|---|---|---|---|
| 9,988,076 B2 * | 6/2018 | Kodera | ............... B62D 6/002 |
| 2005/0209752 A1 | 9/2005 | Ono et al. | |
| 2017/0267276 A1 | 9/2017 | Kodera et al. | |

* cited by examiner

# CONTROLLER FOR STEERING SYSTEM AND METHOD FOR CONTROLLING STEERING SYSTEM

INCORPORATION BY REFERENCE

The disclosure of Japanese Patent Application No. 2018-156288 filed on Aug. 23, 2018 including the specification, drawings and abstract is incorporated herein by reference in its entirety.

BACKGROUND

1. Technical Field

The disclosure relates to a controller for a steering system and a method for controlling the steering system.

2. Description of Related Art

There is a vehicle steering system in which a transmission ratio (gear ratio) between a steering angle of a steering wheel and a steered angle that is a steering angle of each steered wheel is variable based on a vehicle speed. For example, Japanese Unexamined Patent Application Publication No. 2006-56448 (JP 2006-56448 A) discloses a steering system in which the transmission ratio is made variable by providing a transmission ratio variable apparatus midway along a steering shaft. The transmission ratio variable apparatus adds a second steering angle that is based on motor driving to a first steering angle that is based on a steering operation. For example, Japanese Unexamined Patent Application Publication No. 2018-111425 (JP 2018-111425 A) discloses a steer-by-wire type steering system in which power transmission between a steering unit and a steering operation unit configured to turn steered wheels is separated. In this steer-by-wire type steering system, the transmission ratio is made variable by changing the magnitude of a target corresponding steered angle that is a target value of a corresponding steered angle (rotation angle convertible to the steered angle) relative to a target steering angle that is a target value of the steering angle.

In those steering systems, the transmission ratio is changed based on the vehicle speed to achieve a so-called quick gear ratio, for example, at a low vehicle speed. At the quick gear ratio, the change amount of the steered angle in response to the steering operation increases, that is, a (steady) yaw rate gain that is the magnitude of a yaw rate per steering angle increases. Thus, a load on a driver is reduced. For example, at a high vehicle speed, a so-called slow gear ratio is achieved. At the slow gear ratio, the change amount decreases, that is, the yaw rate gain decreases. Thus, the operability of the steering system is improved.

SUMMARY

In the configuration in which the transmission ratio is variable based on the vehicle speed as described above, the operability of the steering system is influenced by a yaw rate change (gradient of the yaw rate) that is a change in the yaw rate along with a change in the transmission ratio (yaw rate gain). For example, the yaw rate change increases when the change amount of the transmission ratio (yaw rate gain) relative to the change amount of the vehicle speed is increased and when the vehicle is steered while being accelerated or decelerated abruptly. Therefore, for example, the driver is likely to turn the steering wheel excessively for a target track, and need corrective steering such as a returning operation. The yaw rate change decreases when the change amount of the transmission ratio (yaw rate gain) relative to the change amount of the vehicle speed is reduced and when the vehicle is steered while being accelerated or decelerated gently. Therefore, for example, the driver is likely to turn the steering wheel insufficiently for the target track, and need corrective steering such as a further turning operation.

In the patent documents described above, however, there is no mention of the influence of the yaw rate change on the operability. Therefore, excellent operability has not been achieved at a higher level as demanded in recent years.

The disclosure improves the operability of the steering system.

A first aspect of the disclosure relates to a controller for a steering system. The steering system is configured such that a transmission ratio between a steering angle of a steering wheel and a steered angle of a steered wheel is variable based on a vehicle speed through actuation of a motor serving as a drive source. The steering wheel is coupled to a steering mechanism. The steered wheel is coupled to a steering operation shaft of the steering mechanism. The controller includes a control circuit configured to calculate a target corresponding steered angle that is a target value of a corresponding steered angle based on the transmission ratio associated with the vehicle speed. The corresponding steered angle is a rotation angle of a rotation shaft, which is convertible to the steered angle whose magnitude is changed relative to a value indicating the steering angle. The control circuit is configured to control the actuation of the motor so that an actual corresponding steered angle is a final target corresponding steered angle that is based on the target corresponding steered angle. The control circuit is configured to calculate the target corresponding steered angle by adjusting the transmission ratio based on a value indicating acceleration or deceleration of a vehicle.

With the configuration described above, the transmission ratio is adjusted based on the value indicating the acceleration or deceleration of the vehicle. Therefore, the yaw rate change along with the change in the transmission ratio (yaw rate gain) can be adjusted when the vehicle is steered while being accelerated or decelerated. For example, an adjustment can be made so that the yaw rate change does not increase excessively when the change amount of the transmission ratio relative to the change amount of the vehicle speed is increased and when the vehicle is accelerated or decelerated abruptly. Thus, the yaw rate change to be caused by steering during the acceleration or deceleration can be optimized, and the operability of the steering system can be improved.

In the controller, the control circuit may be configured to calculate a phase-compensated component by performing phase compensation for the value indicating the steering angle. The control circuit may be configured to calculate the final target corresponding steered angle based on the target corresponding steered angle and the phase-compensated component. The control circuit may be configured to calculate the phase-compensated component by adjusting a phase compensation amount based on the value indicating the acceleration or deceleration of the vehicle.

With the configuration described above, the balance between the yaw rate gain and a yawing response (yaw rate response) to the steering can be optimized. In the controller, the value indicating the acceleration or deceleration of the vehicle may be any one of a longitudinal acceleration of the vehicle, a vehicle speed change amount, and a longitudinal load to be applied to the steered wheel in a longitudinal direction of the vehicle.

With the configuration described above, the transmission ratio is adjusted based on any one of the longitudinal acceleration of the vehicle, the vehicle speed change amount, and the longitudinal load. Thus, the transmission ratio can appropriately be adjusted in response to the acceleration or deceleration of the vehicle.

A second aspect of the disclosure relates to a method for controlling a steering system. The steering system includes a control circuit and is configured such that a transmission ratio between a steering angle of a steering wheel and a steered angle of a steered wheel is variable based on a vehicle speed through actuation of a motor serving as a drive source. The steering wheel is coupled to a steering mechanism. The steered wheel is coupled to a steering operation shaft of the steering mechanism. The method includes: calculating, by the control circuit, a target corresponding steered angle that is a target value of a corresponding steered angle based on the transmission ratio associated with the vehicle speed, the corresponding steered angle being a rotation angle of a rotation shaft, which is convertible to the steered angle whose magnitude is changed relative to a value indicating the steering angle; controlling, by the control circuit, the actuation of the motor so that an actual corresponding steered angle is a final target corresponding steered angle that is based on the target corresponding steered angle; and calculating, by the control circuit, the target corresponding steered angle by adjusting the transmission ratio based on a value indicating acceleration or deceleration of a vehicle.

With the disclosure, the operability of the steering system can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
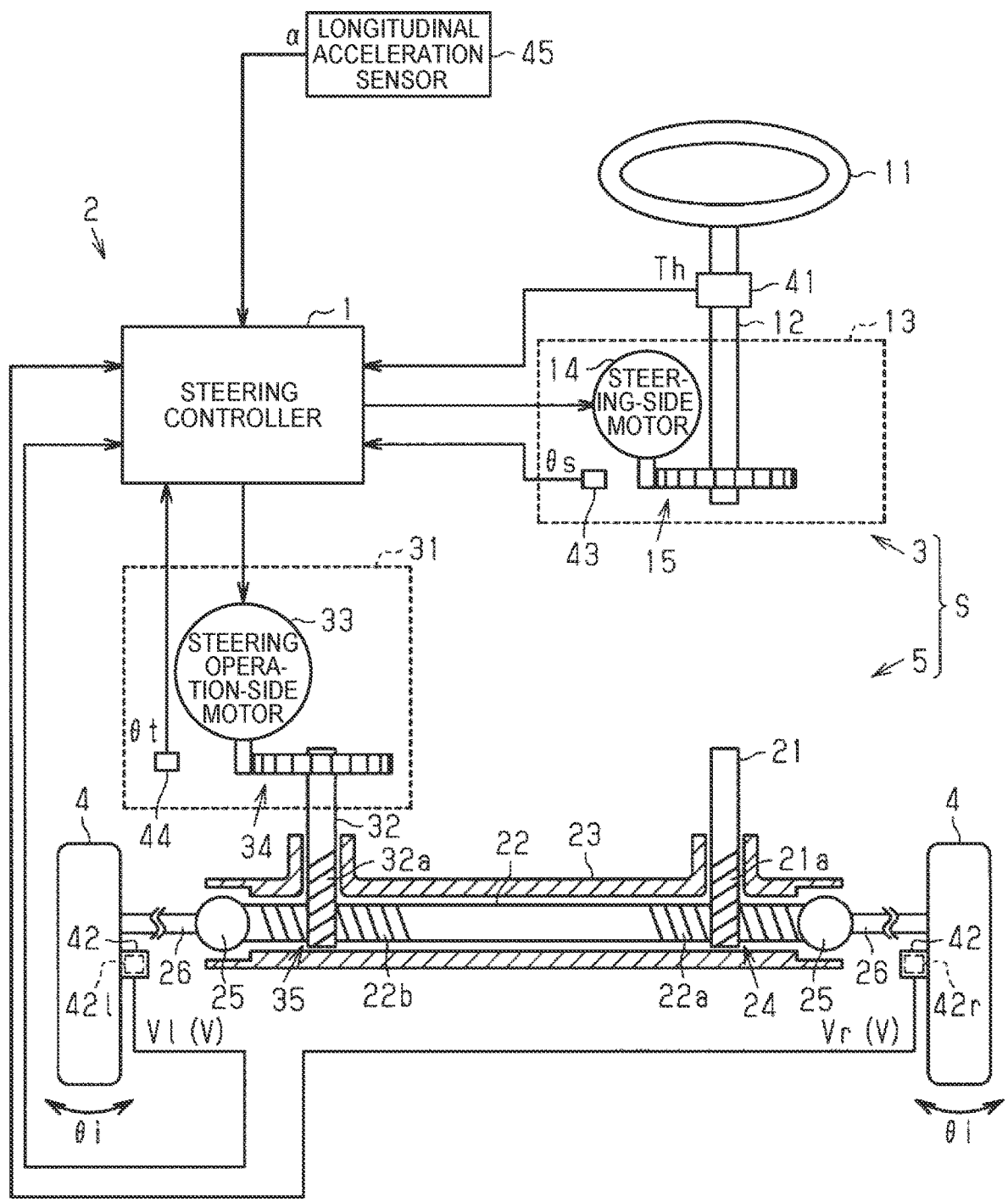
FIG. 1 is a schematic structural diagram of a steer-by-wire type steering system of a first embodiment.

A steering controller of a first embodiment is described below with reference to the drawings. As illustrated in FIG. 1, a steer-by-wire type steering system 2 to be controlled by a steering controller 1 includes a steering unit 3 and a steering operation unit 5. The steering unit 3 is steered by a driver. The steering operation unit 5 turns steered wheels 4 in response to the driver's steering of the steering unit 3. That is, in this embodiment, the steering unit 3 and the steering operation unit 5 constitute a steering mechanism S.

The steering unit 3 includes a steering shaft 12 and a steering-side actuator 13. A steering wheel 11 is fixed to the steering shaft 12. The steering-side actuator 13 is capable of applying a steering reaction force to the steering shaft 12. The steering-side actuator 13 includes a steering-side motor 14 and a steering-side speed reducer 15. The steering-side motor 14 serves as a drive source. The steering-side speed reducer 15 reduces the speed of rotation of the steering-side motor 14, and transmits the rotation to the steering shaft 12. For example, an H-shape, an "8"-shape, or any other non-circular shape is employed as the shape of the steering wheel 11 of this embodiment. For example, the maximum number of turns (lock-to-lock steering angle range) is set to less than one turn.

The steering operation unit 5 includes a first pinion shaft 21, a rack shaft 22, and a rack housing 23. The first pinion shaft 21 serves as a rotation shaft whose rotation angle is convertible to a steered angle θi of each steered wheel 4. The rack shaft 22 is coupled to the first pinion shaft 21. The rack housing 23 houses the rack shaft 22 in a reciprocable manner. The first pinion shaft 21 and the rack shaft 22 are arranged at a predetermined crossing angle. A first rack and pinion mechanism 24 is constructed such that first pinion teeth 21a formed on the first pinion shaft 21 mesh with first rack teeth 22a formed on the rack shaft 22. One axial end side of the rack shaft 22 is supported by the first rack and pinion mechanism 24 in a reciprocable manner. Tie rods 26 are coupled to both ends of the rack shaft 22 via rack ends 25 formed of ball joints. The distal ends of the tie rods 26 are coupled to knuckles (not illustrated) where the steered wheels 4 are mounted.

The steering operation unit 5 is provided with a steering operation-side actuator 31 via a second pinion shaft 32. The steering operation-side actuator 31 applies a steering operation force to the rack shaft 22 so as to turn the steered wheels 4. The steering operation-side actuator 31 includes a steering operation-side motor 33 and a steering operation-side speed reducer 34. The steering operation-side motor 33 serves as a drive source. The steering operation-side speed reducer 34 reduces the speed of rotation of the steering operation-side motor 33, and transmits the rotation to the second pinion shaft 32. The second pinion shaft 32 and the rack shaft 22 are arranged at a predetermined crossing angle. A second rack and pinion mechanism 35 is constructed such that second pinion teeth 32a formed on the second pinion shaft 32 mesh with second rack teeth 22b formed on the rack shaft 22. The other axial end side of the rack shaft 22 is supported by the second rack and pinion mechanism 35 in a reciprocable manner.

In the steering system 2 constructed as described above, the second pinion shaft 32 is driven to rotate by the steering operation-side actuator 31 in response to a driver's steering operation. This rotation is converted to axial movement of the rack shaft 22 by the second rack and pinion mechanism 35. Thus, the steered angle θi of each steered wheel 4 is changed. At this time, the steering reaction force is applied from the steering-side actuator 13 to the steering wheel 11 against the driver's steering.

Next, the electrical configuration of this embodiment is described. The steering controller 1 is connected to the steering-side actuator 13 (steering-side motor 14) and the steering operation-side actuator 31 (steering operation-side motor 33), and controls actuation of those actuators. The steering controller 1 includes a central processing unit (CPU) and a memory (not illustrated), and executes various types of control such that the CPU executes a program stored in the memory in every predetermined calculation period.

A torque sensor 41 is connected to the steering controller 1. The torque sensor 41 detects a steering torque Th applied to the steering shaft 12. The torque sensor 41 is provided closer to the steering wheel 11 with respect to a coupling portion between the steering shaft 12 and the steering-side actuator 13 (steering-side speed reducer 15). A right front wheel sensor 42r and a left front wheel sensor 42l are connected to the steering controller 1. The right front wheel sensor 42r and the left front wheel sensor 42l are provided in hub units 42 that rotatably support the steered wheels 4 together with drive shafts (not illustrated). The right front wheel sensor 42r and the left front wheel sensor 42l detect wheel speeds Vr and Vl of the steered wheels 4, respectively. The steering controller 1 of this embodiment detects a mean value between the wheel speeds Vr and Vl as a vehicle speed V. A steering-side rotation sensor 43 and a steering operation-side rotation sensor 44 are connected to the steering controller 1. The steering-side rotation sensor 43 detects a rotation angle θs of the steering-side motor 14 as a relative angle within a range of 360°. The rotation angle θs is a detection value indicating the steering amount of the steering unit 3. The steering operation-side rotation sensor 44 detects a rotation angle θt of the steering operation-side motor 33 as a relative angle. The rotation angle θt is a detection value indicating the steering operation amount of the steering operation unit 5. A longitudinal acceleration sensor 45 is connected to the steering controller 1. The longitudinal acceleration sensor 45 detects a longitudinal acceleration α that is a value indicating acceleration or deceleration of the vehicle. Each of the steering torque Th and the rotation angles θs and θt is detected as a positive value in a case of steering in one direction (right in this embodiment), and as a negative value in a case of steering in the other direction (left in this embodiment). The steering controller 1 controls the actuation of the steering-side motor 14 and the steering operation-side motor 33 based on the various condition amounts.

Figure 2:
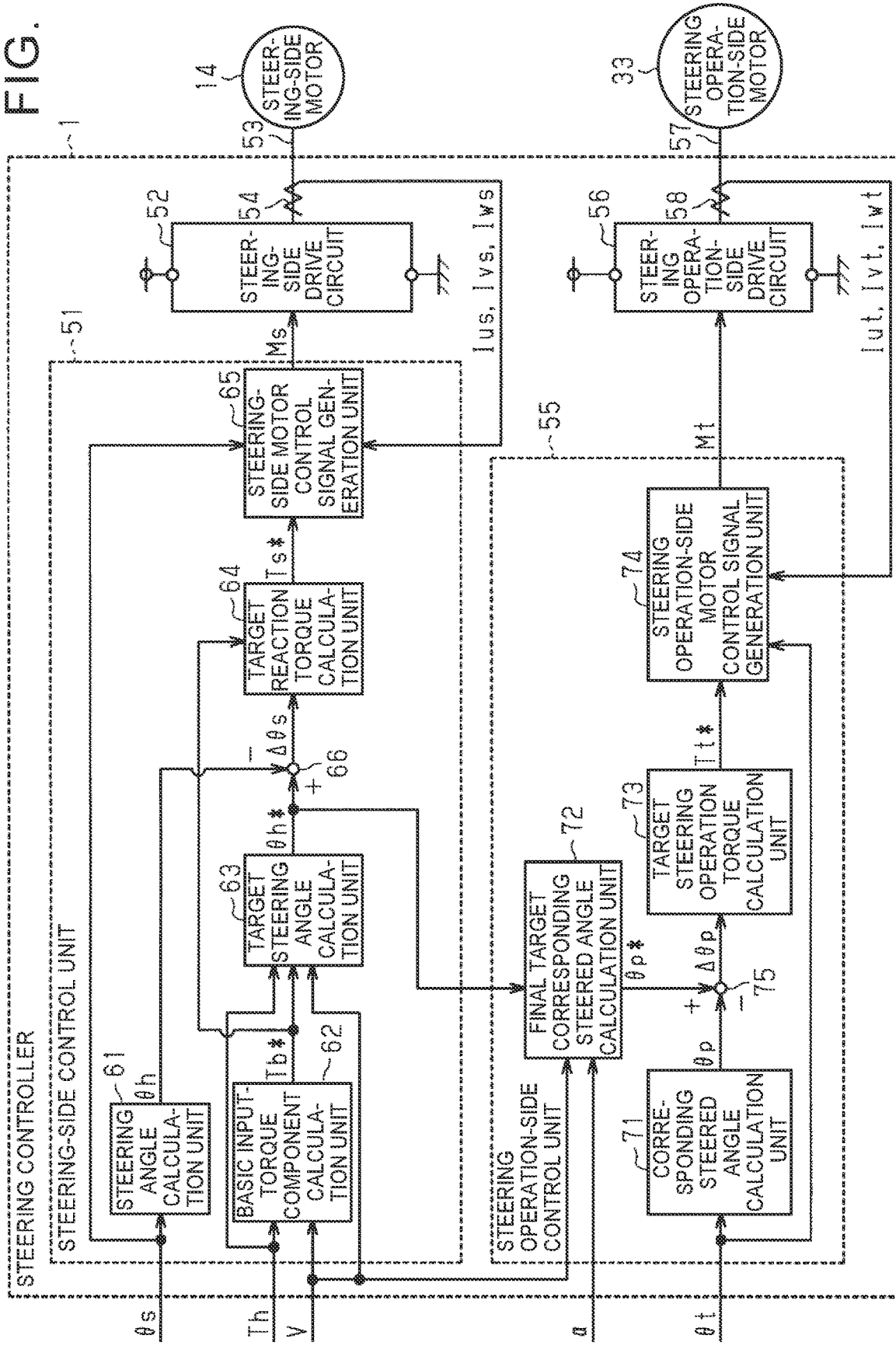
FIG. 2 is a block diagram of a steering controller of the first embodiment.

The configuration of the steering controller 1 is described below in detail. As illustrated in FIG. 2, the steering controller 1 includes a steering-side control unit 51 and a steering-side drive circuit 52. The steering-side control unit 51 outputs a steering-side motor control signal Ms. The steering-side drive circuit 52 supplies driving electric power to the steering-side motor 14 based on the steering-side motor control signal Ms. Current sensors 54 are connected to the steering-side control unit 51. The current sensors 54 detect phase current values Ius, Ivs, and Iws of the steering-side motor 14 that indicate currents flowing through connection lines 53 between the steering-side drive circuit 52 and motor coils of the respective phases of the steering-side motor 14. In FIG. 2, the connection lines 53 of the respective phases and the current sensors 54 of the respective phases are collectively illustrated as one connection line and one current sensor for convenience of the description.

The steering controller 1 includes a steering operation-side control unit 55 and a steering operation-side drive circuit 56. The steering operation-side control unit 55 outputs a steering operation-side motor control signal Mt. The steering operation-side drive circuit 56 supplies driving electric power to the steering operation-side motor 33 based on the steering operation-side motor control signal Mt. Current sensors 58 are connected to the steering operation-side control unit 55. The current sensors 58 detect phase current values Iut, Ivt, and Iwt of the steering operation-side motor 33 that indicate currents flowing through connection lines 57 between the steering operation-side drive circuit 56 and motor coils of the respective phases of the steering operation-side motor 33. In FIG. 2, the connection lines 57 of the respective phases and the current sensors 58 of the respective phases are collectively illustrated as one connection line and one current sensor for convenience of the description. A known pulse width modulation (PWM) inverter having a plurality of switching elements (for example, FETs) is employed as each of the steering-side drive circuit 52 and the steering operation-side drive circuit 56 of this embodiment. Each of the steering-side motor control signal Ms and the steering operation-side motor control signal Mt is a gate ON/OFF signal that defines an ON/OFF state of each switching element.

The steering controller 1 generates the steering-side motor control signal Ms and the steering operation-side motor control signal Mt by executing arithmetic processing shown in each control block described below in every predetermined calculation period. The steering-side motor control signal Ms and the steering operation-side motor control signal Mt are output to the steering-side drive circuit 52 and the steering operation-side drive circuit 56 to turn ON or OFF the switching elements, thereby supplying the driving electric power to the steering-side motor 14 and the steering operation-side motor 33, respectively. Thus, the actuation of the steering-side actuator 13 and the steering operation-side actuator 31 is controlled.

First, the configuration of the steering-side control unit 51 is described. The vehicle speed V, the steering torque Th, the rotation angle θs, and the phase current values Ius, Ivs, and Iws are input to the steering-side control unit 51. The steering-side control unit 51 generates and outputs the steering-side motor control signal Ms based on those condition amounts.

Specifically, the steering-side control unit 51 includes a steering angle calculation unit 61 and a basic input-torque component calculation unit 62. The steering angle calculation unit 61 calculates a steering angle θh of the steering wheel 11 based on the rotation angle θs of the steering-side motor 14. The basic input-torque component calculation unit 62 calculates a basic input-torque component Tb* based on the vehicle speed V and the steering torque Th. The basic input-torque component Tb* is a force for rotating the steering wheel 11. The steering-side control unit 51 further includes a target steering angle calculation unit 63 configured to calculate a target steering angle θh* based on the steering torque Th, the vehicle speed V, and the basic input-torque component Tb*. The steering-side control unit 51 further includes a target reaction torque calculation unit 64 and a steering-side motor control signal generation unit 65. The target reaction torque calculation unit 64 calculates a target reaction torque Ts* based on the steering angle θh and the target steering angle θh*. The steering-side motor control signal generation unit 65 generates the steering-side motor control signal Ms based on the target reaction torque Ts*, the rotation angle θs, and the phase current values Ius, Ivs, and Iws.

The steering angle calculation unit 61 acquires the rotation angle θs such that the input rotation angle θs is converted to an absolute angle within a range over 360° by, for example, counting the number of revolutions of the steering-side motor 14 from a neutral steering position. The steering angle calculation unit 61 calculates the steering angle θh by multiplying the rotation angle converted to the absolute angle by a conversion factor Ks that is based on a rotation speed ratio of the steering-side speed reducer 15.

The steering torque Th and the vehicle speed V are input to the basic input-torque component calculation unit 62. The basic input-torque component calculation unit 62 calculates a basic input-torque component (basic reaction-force component) Tb* having a larger absolute value as the absolute value of the steering torque Th increases and as the vehicle speed V increases. The basic input-torque component Tb* is input to the target steering angle calculation unit 63 and the target reaction torque calculation unit 64.

The steering torque Th, the vehicle speed V, and the basic input-torque component Tb* are input to the target steering angle calculation unit 63. The target steering angle calculation unit 63 calculates the target steering angle θh* by using a model formula in which an input torque is associated with the target steering angle θh*. The input torque is a value obtained by adding the steering torque Th to the basic input-torque component Tb*. Examples of the model formula that may be used include a representation that defines a relationship between the rotation angle and a torque applied to the rotation shaft whose rotation angle is convertible to the steered angle θi of each steered wheel 4 on the premise that the steering wheel 11 and the steered wheels 4 are mechanically coupled together. The model formula is represented by using a spring modulus K obtained by modeling elasticity of the steering system 2, a coefficient of viscosity C obtained by modeling, for example, friction of the steering system 2, and a factor of inertia J obtained by modeling inertia of the steering system 2. The target steering angle θh* calculated in this manner is output to a subtractor 66 and the steering operation-side control unit 55.

An angular deviation Δθs is input to the target reaction torque calculation unit 64 in addition to the basic input-torque component Tb*. The angular deviation Δθs is obtained by subtracting the steering angle θh from the target steering angle θh* in the subtractor 66. Based on the angular deviation Δθs, the target reaction torque calculation unit 64 calculates a basic reaction torque serving as a basis for the steering reaction force to be applied by the steering-side motor 14 as a control amount for feedback control of the steering angle θh to the target steering angle θh*. The target reaction torque calculation unit 64 calculates the target reaction torque Ts* by adding the basic input-torque component Tb* to the basic reaction torque. Specifically, the target reaction torque calculation unit 64 calculates, as the basic reaction torque, the sum of output values of a proportional element, an integral element, and a derivative element based on the angular deviation Δθs as an input.

The rotation angle θs and the phase current values Ius, Ivs, and Iws are input to the steering-side motor control signal generation unit 65 in addition to the target reaction torque Ts*. The steering-side motor control signal generation unit 65 of this embodiment calculates a q-axis target current value Iqs* on a q-axis in a d/q coordinate system based on the target reaction torque Ts*. In this embodiment, a d-axis target current value Ids* on a d-axis is set to 0.

The steering-side motor control signal generation unit 65 generates (calculates) the steering-side motor control signal Ms to be output to the steering-side drive circuit 52 by executing current feedback control in the d/q coordinate system. Specifically, the steering-side motor control signal generation unit 65 calculates a d-axis current value Ids and a q-axis current value Iqs by mapping the phase current values Ius, Ivs, and Iws on d/q coordinates based on the rotation angle θs. The d-axis current value Ids and the q-axis current value Iqs are actual current values of the steering-side motor 14 in the d/q coordinate system. The steering-side motor control signal generation unit 65 calculates voltage command values based on current deviations on the d-axis and the q-axis so that the d-axis current value Ids follows the d-axis target current value Ids* and the q-axis current value Iqs follows the q-axis target current value Iqs*, and generates a steering-side motor control signal Ms having duty ratios that are based on the voltage command values. By outputting the steering-side motor control signal Ms calculated in this manner to the steering-side drive circuit 52, driving electric power is output to the steering-side motor 14 based on the steering-side motor control signal Ms to control the actuation of the steering-side motor 14.

Next, the steering operation-side control unit 55 is described. The rotation angle θt, the vehicle speed V, the target steering angle θh*, the longitudinal acceleration α, and the phase current values Iut, Ivt, and Iwt are input to the steering operation-side control unit 55. The steering operation-side control unit 55 generates and outputs the steering operation-side motor control signal Mt based on those condition amounts.

Specifically, the steering operation-side control unit 55 includes a corresponding steered angle calculation unit 71 configured to calculate a corresponding steered angle θp based on the rotation angle θt of the steering operation-side motor 33. The corresponding steered angle θp corresponds to a rotation angle (pinion angle) of the first pinion shaft 21 serving as the rotation shaft whose rotation angle is convertible to the steered angle θi of each steered wheel 4. The steering operation-side control unit 55 further includes a final target corresponding steered angle calculation unit 72 configured to calculate a final target corresponding steered angle θp* that is a final target value of the corresponding steered angle θp based on the target steering angle θh*, the vehicle speed V, and the longitudinal acceleration α so that a transmission ratio (gear ratio) between the steering angle θh and the steered angle θi (see FIG. 1) is made variable. The steering operation-side control unit 55 further includes a target steering operation torque calculation unit 73 and a steering operation-side motor control signal generation unit 74. The target steering operation torque calculation unit 73 calculates a target steering operation torque Tt* based on the corresponding steered angle θp and the final target corresponding steered angle θp*. The steering operation-side motor control signal generation unit 74 generates the steering operation-side motor control signal Mt based on the target steering operation torque Tt*, the rotation angle θt, and the phase current values Iut, Ivt, and Iwt.

The corresponding steered angle calculation unit 71 acquires the rotation angle θt such that the input rotation angle θt is converted to an absolute angle by, for example, counting the number of revolutions of the steering operation-side motor 33 from a neutral position where the vehicle travels straightforward. The corresponding steered angle calculation unit 71 calculates the corresponding steered angle θp by multiplying the rotation angle converted to the absolute angle by a conversion factor Kt that is based on a rotation speed ratio of the steering operation-side speed reducer 34 and rotation speed ratios of the first and second rack and pinion mechanisms 24 and 35.

An angular deviation Δθp is input to the target steering operation torque calculation unit 73. The angular deviation Δθp is obtained by subtracting the corresponding steered angle θp from the final target corresponding steered angle θp* in a subtractor 75. Based on the angular deviation Δθp, the target steering operation torque calculation unit 73 calculates the target steering operation torque Tt* that is a target value of the steering operation force to be applied by the steering operation-side motor 33 as a control amount for feedback control of the corresponding steered angle θp to the final target corresponding steered angle θp*. Specifically, the target steering operation torque calculation unit 73 calculates, as the target steering operation torque Tt*, the sum of output values of a proportional element, an integral element, and a derivative element based on the angular deviation Δθp as an input.

The rotation angle θt and the phase current values Iut, Ivt, and Iwt are input to the steering operation-side motor control signal generation unit 74 in addition to the target steering operation torque Tt*. The steering operation-side motor control signal generation unit 74 calculates a q-axis target current value Iqt* on the q-axis in the d/q coordinate system based on the target steering operation torque Tt*. In this embodiment, a d-axis target current value Idt* on the d-axis is set to 0.

The steering operation-side motor control signal generation unit 74 generates (calculates) the steering operation-side motor control signal Mt to be output to the steering operation-side drive circuit 56 by executing current feedback control in the d/q coordinate system. Specifically, the steering operation-side motor control signal generation unit 74 calculates a d-axis current value Idt and a q-axis current value Iqt by mapping the phase current values Iut, Ivt, and Iwt on the d/q coordinates based on the rotation angle θt. The d-axis current value Idt and the q-axis current value Iqt are actual current values of the steering operation-side motor 33 in the d/q coordinate system. The steering operation-side motor control signal generation unit 74 calculates voltage command values based on current deviations on the d-axis and the q-axis so that the d-axis current value Idt follows the d-axis target current value Idt* and the q-axis current value Iqt follows the q-axis target current value Iqt*, and generates a steering operation-side motor control signal Mt having duty ratios that are based on the voltage command values. By outputting the steering operation-side motor control signal Mt calculated in this manner to the steering operation-side drive circuit 56, driving electric power is output to the steering operation-side motor 33 based on the steering operation-side motor control signal Mt to control the actuation of the steering operation-side motor 33.

Next, the final target corresponding steered angle calculation unit 72 is described. The target steering angle θh*, the vehicle speed V, and the longitudinal acceleration α are input to the final target corresponding steered angle calculation unit 72. Based on those condition amounts, the final target corresponding steered angle calculation unit 72 calculates a final target corresponding steered angle θp* whose magnitude (absolute value) is changed relative to the target steering angle θh*. In this embodiment, the target steering angle θh* that is based on the steering torque Th is used as a value indicating the steering angle θh, and the longitudinal acceleration α is used as a value indicating the acceleration or deceleration of the vehicle.

Figure 3:
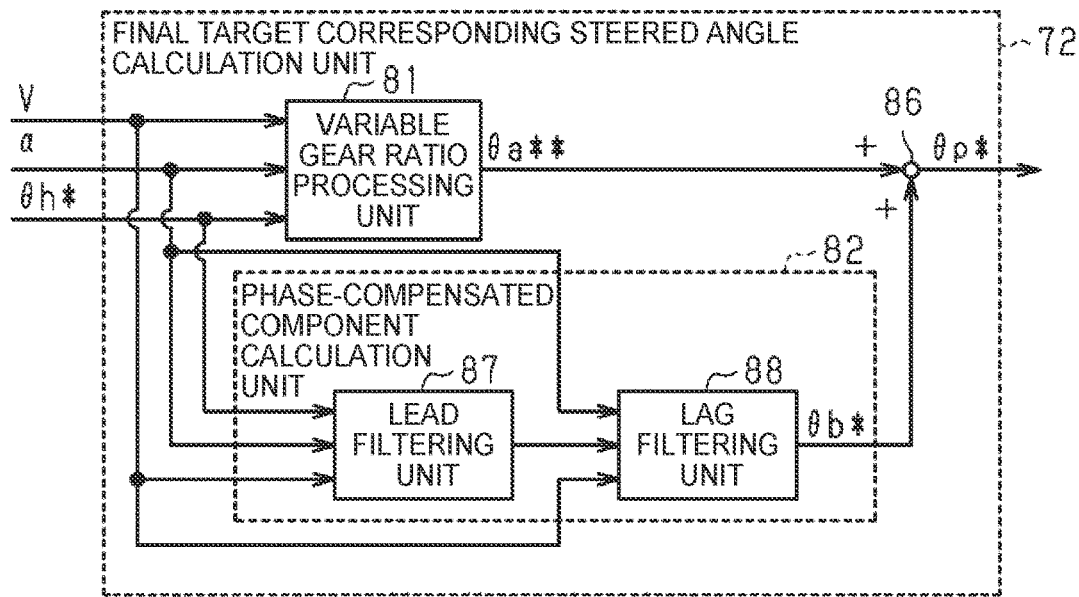
FIG. 3 is a block diagram of a final target corresponding steered angle calculation unit of the first embodiment.

Specifically, as illustrated in FIG. 3, the final target corresponding steered angle calculation unit 72 includes a variable gear ratio processing unit 81 configured to calculate a transmission ratio correction target corresponding steered angle θa** based on the transmission ratio associated with the vehicle speed V and the target steering angle θh*. The transmission ratio correction target corresponding steered angle θa** is a target value of the corresponding steered angle θp whose magnitude is changed relative to the target steering angle θh*. The final target corresponding steered angle calculation unit 72 further includes a phase-compensated component calculation unit 82 configured to calculate a phase-compensated component θb* by performing phase compensation for the target steering angle θh*.

Figure 4:
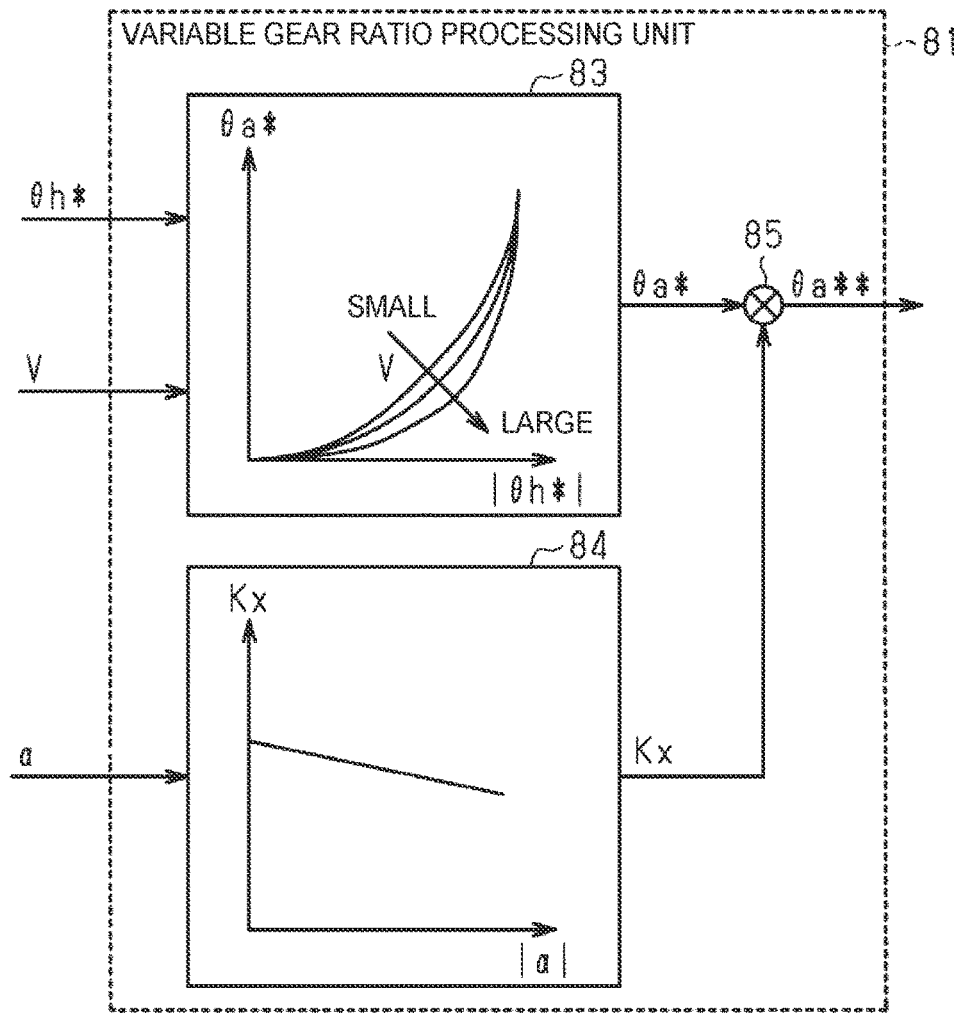
FIG. 4 is a block diagram of a variable gear ratio processing unit of the first embodiment.

As illustrated in FIG. 4, the variable gear ratio processing unit 81 includes a gear ratio calculation unit 83 and an acceleration/deceleration gain calculation unit 84. The gear ratio calculation unit 83 calculates a transmission ratio correction target corresponding steered angle θa* based on the target steering angle θh* and the vehicle speed V. The acceleration/deceleration gain calculation unit 84 calculates an acceleration/deceleration gain Kx based on the longitudinal acceleration α. The gear ratio calculation unit 83 has a map that defines a relationship between the transmission ratio correction target corresponding steered angle θa* and each of the target steering angle θh* and the vehicle speed V, and calculates the transmission ratio correction target corresponding steered angle θa* based on the target steering angle θh* and the vehicle speed V by referring to the map. With this map, the transmission ratio correction target corresponding steered angle θa* is calculated so that the absolute value of the transmission ratio correction target corresponding steered angle θa* and the change rate of the transmission ratio correction target corresponding steered angle θa* relative to the target steering angle θh* increase as the absolute value of the target steering angle θh* increases. The map is set so that the transmission ratio correction target corresponding steered angle θa* decreases, that is, the transmission ratio increases (becomes a slower gear ratio) based on an increase in the vehicle speed V. In FIG. 4, graduations (scale) on a horizontal axis representing the target steering angle θh* are set narrower than graduations on a vertical axis representing the transmission ratio correction target corresponding steered angle θa*. Since the maximum number of turns of the steering wheel 11 is small as described above, the transmission ratio is set relatively small (as a quick gear ratio) over the entire range of the target steering angle θh*. The transmission ratio correction target corresponding steered angle θa* calculated in this manner is output to a multiplier 85.

The acceleration/deceleration gain calculation unit 84 has a map that defines a relationship between the longitudinal acceleration α and the acceleration/deceleration gain Kx, and calculates the acceleration/deceleration gain Kx based on the longitudinal acceleration α by referring to the map. The map is set so that the acceleration/deceleration gain Kx decreases based on an increase in the absolute value of the longitudinal acceleration α. The profile of the map may be changed as appropriate, and the map may be set, for example, so that the acceleration/deceleration gain Kx increases based on the increase in the absolute value of the longitudinal acceleration α. The acceleration/deceleration gain Kx calculated in this manner is output to the multiplier 85.

The variable gear ratio processing unit 81 calculates the transmission ratio correction target corresponding steered angle θa** by multiplying the transmission ratio correction target corresponding steered angle θa* by the acceleration/deceleration gain Kx in the multiplier 85. The transmission ratio correction target corresponding steered angle θa** calculated in this manner is output to an adder 86 (see FIG. 3).

As illustrated in FIG. 3, the target steering angle θh*, the vehicle speed V, and the longitudinal acceleration α are input to the phase-compensated component calculation unit 82. The phase-compensated component calculation unit 82 calculates the phase-compensated component θb* based on those condition amounts.

Specifically, the phase-compensated component calculation unit 82 includes a lead filtering unit 87 and a lag filtering unit 88. The lead filtering unit 87 performs phase-lead compensation for the target steering angle θh*. The lag filtering unit 88 performs phase-lag compensation for an output value from the lead filtering unit 87. That is, the phase-compensated component calculation unit 82 calculates the phase-compensated component θb* by performing phase-lead-lag compensation (band-pass filtering) for the target steering angle θh*.

Specifically, a transfer function $G_1(s)$ represented by, for example, Expression (1) is set in the lead filtering unit 87.

$$G_1(s) = a_1 \times s + a_0 \quad (1)$$

A transfer function $G_2(s)$ represented by, for example, Expression (2) is set in the lag filtering unit 88.

$$G_2(s) = \frac{a_0}{b_1 \times s + b_0} \quad (2)$$

In the expressions, "$a_1$" and "$b_1$" represent coefficients that change based on the vehicle speed V and the longitudinal acceleration α. In this embodiment, the coefficients are set so that a phase-compensated component θb* having a phase leading more as the transmission ratio decreases is calculated based on the longitudinal acceleration α. Further, "$a_0$" and "$b_0$" represent predetermined constants, which are set in advance based on results of an experiment or the like.

A general formula of a transfer function $G_x(s)$ of a filter is represented by Expression (3). In this embodiment, a first order transfer function is employed as each of the transfer function $G_1(s)$ representing a lead filter and the transfer function $G_2(s)$ representing a lag filter, but a second or higher order transfer function may be used. In the expression, "m" and "n" are natural numbers, and satisfy a relationship of "m>n" in the case of the lead filter, and a relationship of "m<n" in the case of the lag filter.

$$G_x(s) = \frac{a_m \times s^m + a_{m-1} \times s^{m-1} + \ldots + a_0}{b_n \times s^n + b_{n-1} \times s^{n-1} + \ldots + b_0} \quad (3)$$

The phase-compensated component θb* calculated in this manner is output to the adder 86. The final target corresponding steered angle calculation unit 72 calculates the final target corresponding steered angle θp* by adding the transmission ratio correction target corresponding steered angle θa** and the phase-compensated component θb* together in the adder 86.

Figure 5A:
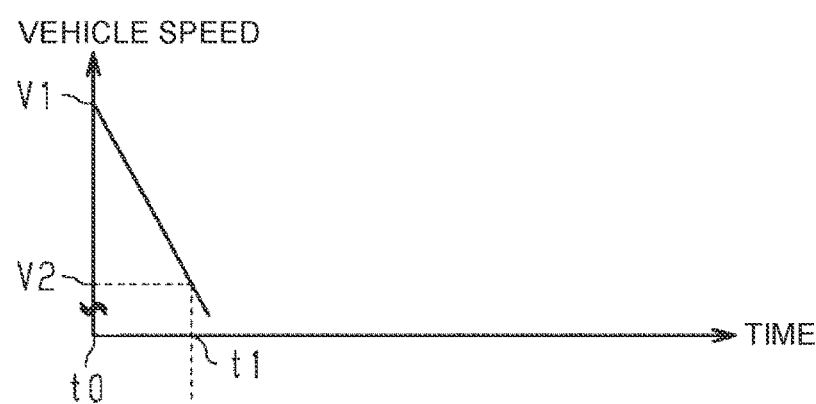
FIG. 5A is a graph illustrating an example of a relationship between time and a vehicle speed in a case where a transmission ratio is small.

Next, description is given of a steering feel obtained when the vehicle is steered while being accelerated or decelerated. For example, as illustrated in FIG. 5A, it is assumed that the vehicle is steered while being abruptly decelerated from a state in which the vehicle speed V is a first vehicle speed V1 at a time t0 to a state in which the vehicle speed V is a second vehicle speed V2 lower than the first vehicle speed V1 (V1>V2) at a time t1. Based on the change in the vehicle speed V, the transmission ratio decreases (see FIG. 4), that is, a (steady) yaw rate gain that is the magnitude of a yaw rate γ per steering angle θh increases. The yaw rate γ changes from a first yaw rate γ1 associated with a transmission ratio (yaw rate gain) at the first vehicle speed V1 to a second yaw rate γ2 associated with a transmission ratio (yaw rate gain) at the second vehicle speed V2 (γ1<γ2).

Figure 5B:
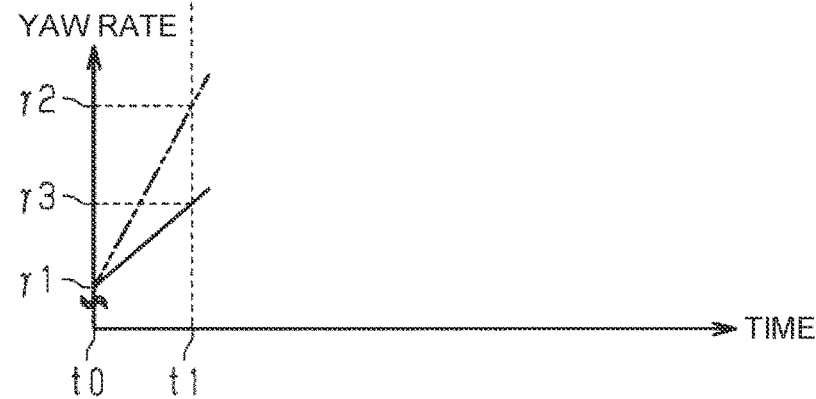
FIG. 5B is a graph illustrating an example of a relationship between the time and a yaw rate in the same case.

In a related-art example in which the final target corresponding steered angle θp* is calculated without consideration of the longitudinal acceleration α, as indicated by a long dashed double-short dashed line in FIG. 5B, the yaw rate γ that is the first yaw rate γ1 at the time t0 changes to the second yaw rate γ2 in a short period of time to the time t1. Since the yaw rate change (yaw angular acceleration) increases, for example, the driver is likely to turn the steering wheel excessively for a target track, and need corrective steering such as a returning operation.

In this respect, the acceleration/deceleration gain Kx that decreases based on the increase in the absolute value of the longitudinal acceleration α is calculated as described above in this embodiment. Therefore, the magnitude of the final target corresponding steered angle θp* (transmission ratio correction target corresponding steered angle θa*) relative to the target steering angle θh* decreases during, for example, deceleration. That is, the change amount of the yaw rate gain relative to the change amount of the vehicle speed V decreases. Therefore, as illustrated in FIG. 5B, the yaw rate γ changes to a third yaw rate γ3 lower than the second yaw rate γ2 (γ2>γ3) at the time t1. Thus, an excessive increase in the yaw rate change is suppressed, thereby suppressing the situation in which the driver turns the steering wheel excessively for the target track.

Figure 6A:
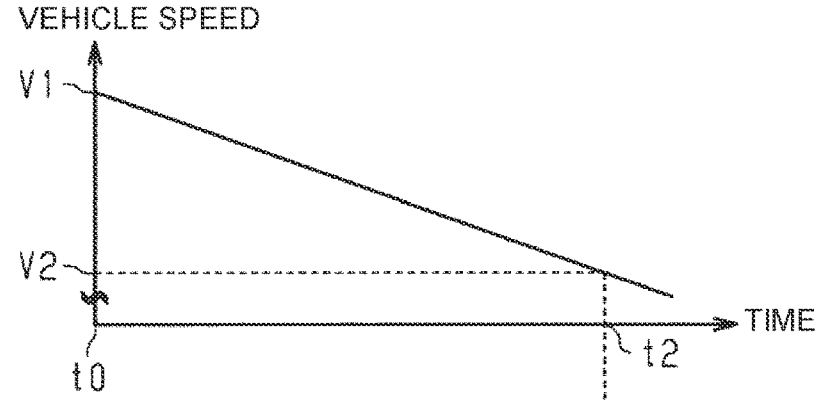
FIG. 6A is a graph illustrating an example of a relationship between the time and the vehicle speed in a case where the transmission ratio is large.

Next, it is assumed as a modified example that a circular steering wheel is employed as the steering wheel 11, the maximum number of turns is set as large as, for example, about 3.5 turns, and the transmission ratio is set relatively large (as a slow gear ratio) over the entire range of the target steering angle θh*. For example, as illustrated in FIG. 6A, the vehicle is steered while being gently decelerated from a state in which the vehicle speed V is the first vehicle speed V1 at the time t0 to a state in which the vehicle speed V is the second vehicle speed V2 at a time t2. Based on the change in the vehicle speed V, the transmission ratio decreases, and the yaw rate γ changes from the first yaw rate γ1 to the second yaw rate γ2.

Figure 6B:
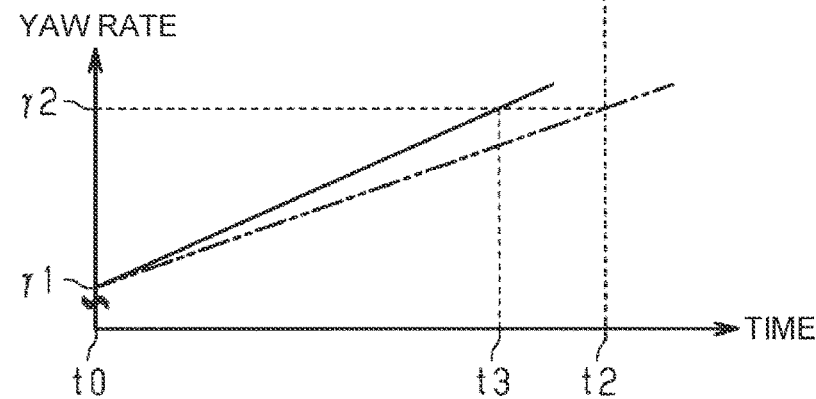
FIG. 6B is a graph illustrating a relationship between the time and the yaw rate in the same case.

In the related-art example in which the final target corresponding steered angle θp* is calculated without consideration of the longitudinal acceleration α, as indicated by a long dashed double-short dashed line in FIG. 6B, the yaw rate γ that is the first yaw rate γ1 at the time t0 changes to the second yaw rate γ2 over a long period of time to the time t2. Since the yaw rate change (yaw angular acceleration) decreases, for example, the driver is likely to turn the steering wheel insufficiently for the target track, and need corrective steering such as a further turning operation.

In this respect, the magnitude of the final target corresponding steered angle θp* (transmission ratio correction target corresponding steered angle θa*) relative to the target steering angle θh* increases during, for example, deceleration by employing the configuration in which the acceleration/deceleration gain Kx that increases based on the increase in the absolute value of the longitudinal acceleration α is calculated as the modified example. That is, the change amount of the yaw rate gain relative to the change amount of the vehicle speed V increases. Therefore, as illustrated in FIG. 6B, the yaw rate γ changes to the second yaw rate γ2 at a time t3 before the time t2. Thus, an excessive decrease in the yaw rate change is suppressed, thereby suppressing the situation in which the driver turns the steering wheel insufficiently for the target track.

Next, actions and effects of this embodiment are described. The variable gear ratio processing unit 81 calculates the transmission ratio correction target corresponding steered angle θa by adjusting the transmission ratio based on the longitudinal acceleration α. Therefore, the yaw rate change along with the change in the transmission ratio (yaw rate gain) can be adjusted when the vehicle is steered while being accelerated or decelerated. Thus, the yaw rate change to be caused by steering during the acceleration or deceleration can be optimized, and the operability of the steering system 2 can be improved. In particular, the variable gear ratio processing unit 81 of this embodiment calculates the transmission ratio correction target corresponding steered angle θa by making an adjustment so that the transmission ratio increases based on the increase in the absolute value of the longitudinal acceleration α. Therefore, the change amount of the transmission ratio (yaw rate gain) decreases and the yaw rate change also decreases when the vehicle is steered while being accelerated or decelerated abruptly. Thus, excellent steering stability can be attained.

The phase-compensated component calculation unit 82 calculates the phase-compensated component θb* by adjusting a phase compensation amount based on the longitudinal acceleration α. Thus, the balance between the yaw rate gain and a yawing response (yaw rate response) can be optimized. In particular, the phase-compensated component calculation unit 82 of this embodiment calculates the phase-compensated component θb* based on the longitudinal acceleration α so that the phase leads more in a case where the transmission ratio is small than a case where the transmission ratio is large. Therefore, the yawing response increases when the transmission ratio is small and the yaw rate change is large. Thus, the balance between the yaw rate gain and the yaw rate response can be optimized.

Since the transmission ratio and the phase compensation amount are adjusted based on the longitudinal acceleration α of the vehicle, those values can appropriately be adjusted in response to the acceleration or deceleration of the vehicle.

Next, a steering controller of a second embodiment is described with reference to the drawings. For convenience of the description, the same components are represented by the same reference symbols as those in the first embodiment to omit their description.

Figure 7:
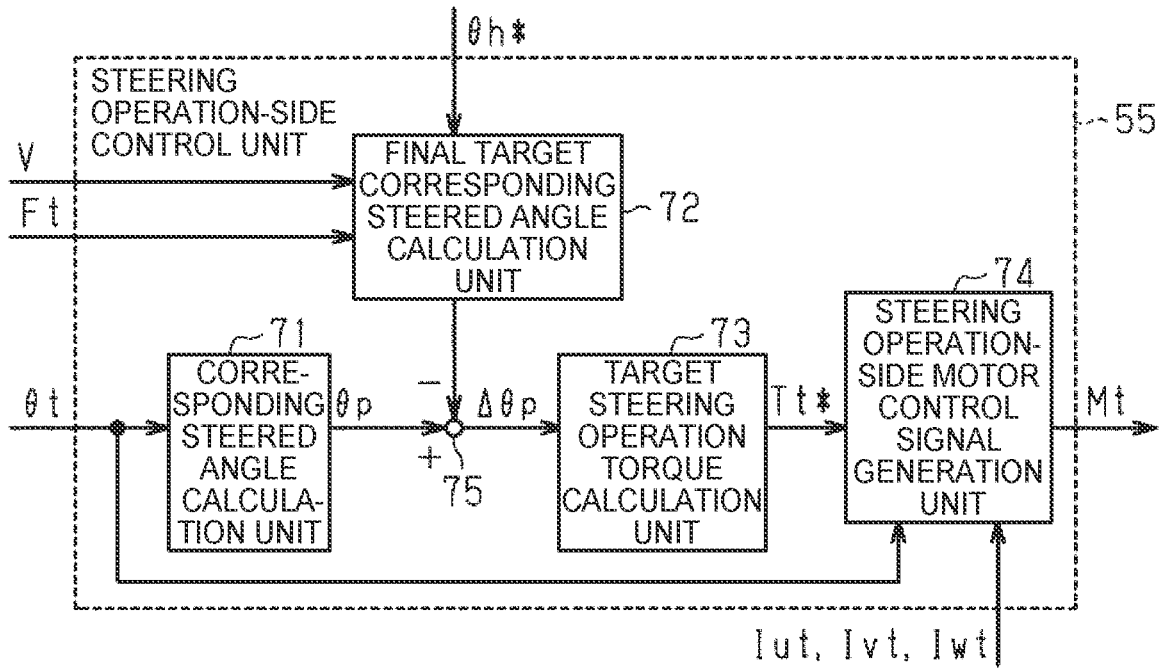
FIG. 7 is a block diagram of a steering operation-side control unit of a second embodiment.

As illustrated in FIG. 7, a longitudinal load (tire force) Ft is input to the final target corresponding steered angle calculation unit 72 of this embodiment in addition to the target steering angle θh* and the vehicle speed V and in place of the longitudinal acceleration α. The longitudinal load Ft is detected in the hub units 42 (see FIG. 1), and is applied in a longitudinally horizontal direction of the vehicle. Similarly to the first embodiment, the final target corresponding steered angle calculation unit 72 adjusts the final target corresponding steered angle θp* based on the longitudinal load Ft. In this embodiment, the longitudinal load Ft can be regarded as the value indicating the acceleration or deceleration of the vehicle.

In this embodiment, the following action and effect are attained in addition to actions and effects similar to the actions and effects of the first embodiment. Since the transmission ratio and the phase compensation amount are adjusted based on the longitudinal load Ft, those values can appropriately be adjusted in response to the acceleration or deceleration of the vehicle.

Next, a steering controller of a third embodiment is described with reference to the drawings. For convenience of the description, the same components are represented by the same reference symbols as those in the first embodiment to omit their description.

Figure 8:
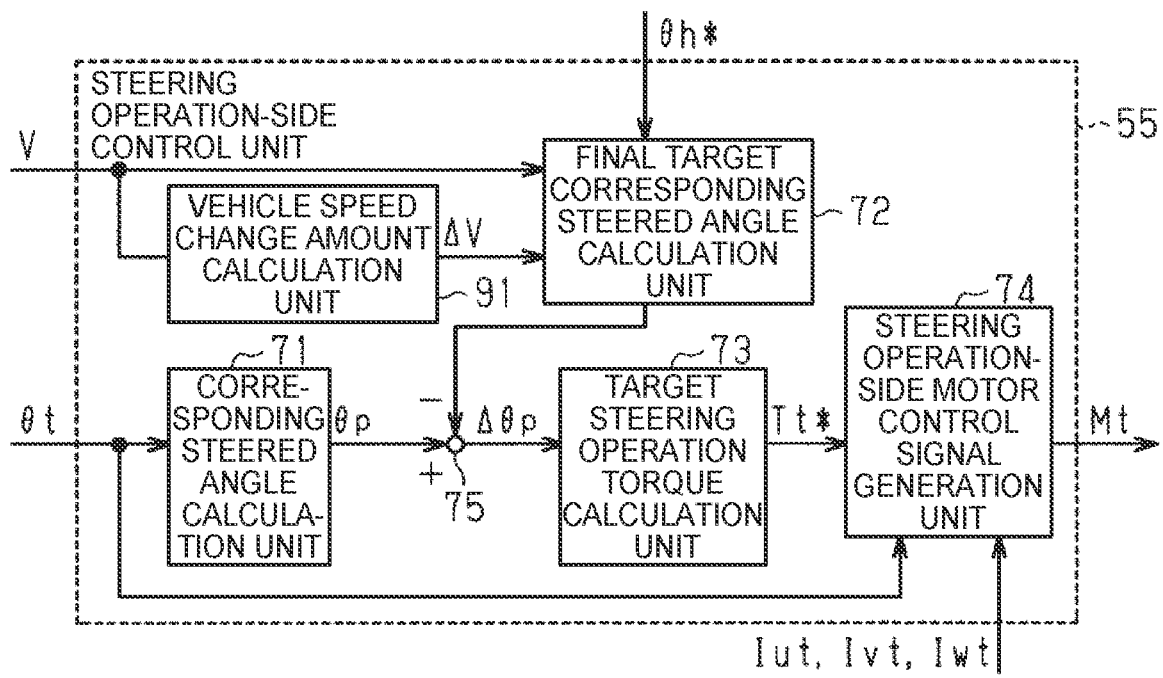
FIG. 8 is a block diagram of a steering operation-side control unit of a third embodiment.

As illustrated in FIG. 8, the steering operation-side control unit 55 of this embodiment includes a vehicle speed change amount calculation unit 91 configured to calculate a vehicle speed change amount ΔV during a predetermined period based on the vehicle speed V. The vehicle speed change amount calculation unit 91 calculates, as the vehicle speed change amount ΔV, a difference between a vehicle speed V input during the latest calculation period and a vehicle speed V input, for example, earlier by one calculation period, and outputs the difference to the final target corresponding steered angle calculation unit 72. The vehicle speed change amount ΔV is input to the final target corresponding steered angle calculation unit 72 in addition to the target steering angle θh* and the vehicle speed V and in place of the longitudinal acceleration α. Similarly to the first embodiment, the final target corresponding steered angle calculation unit 72 adjusts the final target corresponding steered angle θp* based on the vehicle speed change amount ΔV. In this embodiment, the vehicle speed change amount ΔV can be regarded as the value indicating the acceleration or deceleration of the vehicle.

In this embodiment, the following action and effect are attained in addition to actions and effects similar to the actions and effects of the first embodiment. Since the transmission ratio and the phase compensation amount are adjusted based on the vehicle speed change amount ΔV, those values can appropriately be adjusted in response to the acceleration or deceleration of the vehicle.

The embodiments described above may be modified as follows. The embodiments described above and modified examples described below may be combined without causing any technical contradiction. In the embodiments described above, the gear ratio calculation unit 83 calculates the transmission ratio correction target corresponding steered angle θa* by referring to the map that defines the relationship between the transmission ratio correction target corresponding steered angle θa* and each of the target steering angle θh* and the vehicle speed V. However, the disclosure is not limited to this case. For example, the gear ratio calculation unit 83 may calculate a correction angle associated with the transmission ratio based on the target steering angle θh* and the vehicle speed V, and calculate the transmission ratio correction target corresponding steered angle θa* by adding the correction angle to the target steering angle θh*.

In the embodiments described above, the transmission ratio is changed based on the vehicle speed V and the target steering angle θh*, but the disclosure is not limited to this case. For example, the transmission ratio may be changed based on the vehicle speed V alone. In the embodiments described above, the phase-compensated component calculation unit 82 may calculate the phase-compensated component θb* so that, for example, the phase lags more in the case where the transmission ratio is small than the case where the transmission ratio is large.

In the embodiments described above, the phase-compensated component calculation unit 82 may perform only the phase-lead compensation or the phase-lag compensation as the phase compensation. The final target corresponding steered angle calculation unit 72 may use the transmission ratio correction target corresponding steered angle θa** directly as the final target corresponding steered angle θp* without the phase-compensated component calculation unit 82.

In the embodiments described above, the mean value between the wheel speeds is used as the vehicle speed V, but the disclosure is not limited to this case. For example, the second highest wheel speed among the wheel speeds may be used. Without using the wheel speed, a positioning signal may be received from an artificial satellite for the Global Positioning System (GPS), and an estimated vehicle speed that is estimated from a positional change (movement amount) of the vehicle in terms of time based on the received positioning signal may be used as the vehicle speed V.

In the embodiments described above, the final target corresponding steered angle calculation unit 72 may calculate the final target corresponding steered angle θp* by using the steering angle θh in place of the target steering angle θh*. That is, the steering angle θh may directly be used as the value indicating the steering angle θh.

In the embodiments described above, the steering system 2 to be controlled by the steering controller 1 is the linkless steer-by-wire type steering system in which power transmission between the steering unit 3 and the steering operation unit 5 is separated, but the disclosure is not limited to this case. The steering system 2 may be a steer-by-wire type steering system in which the power transmission between the steering unit 3 and the steering operation unit 5 can be connected and disconnected by a clutch.

Figure 9:
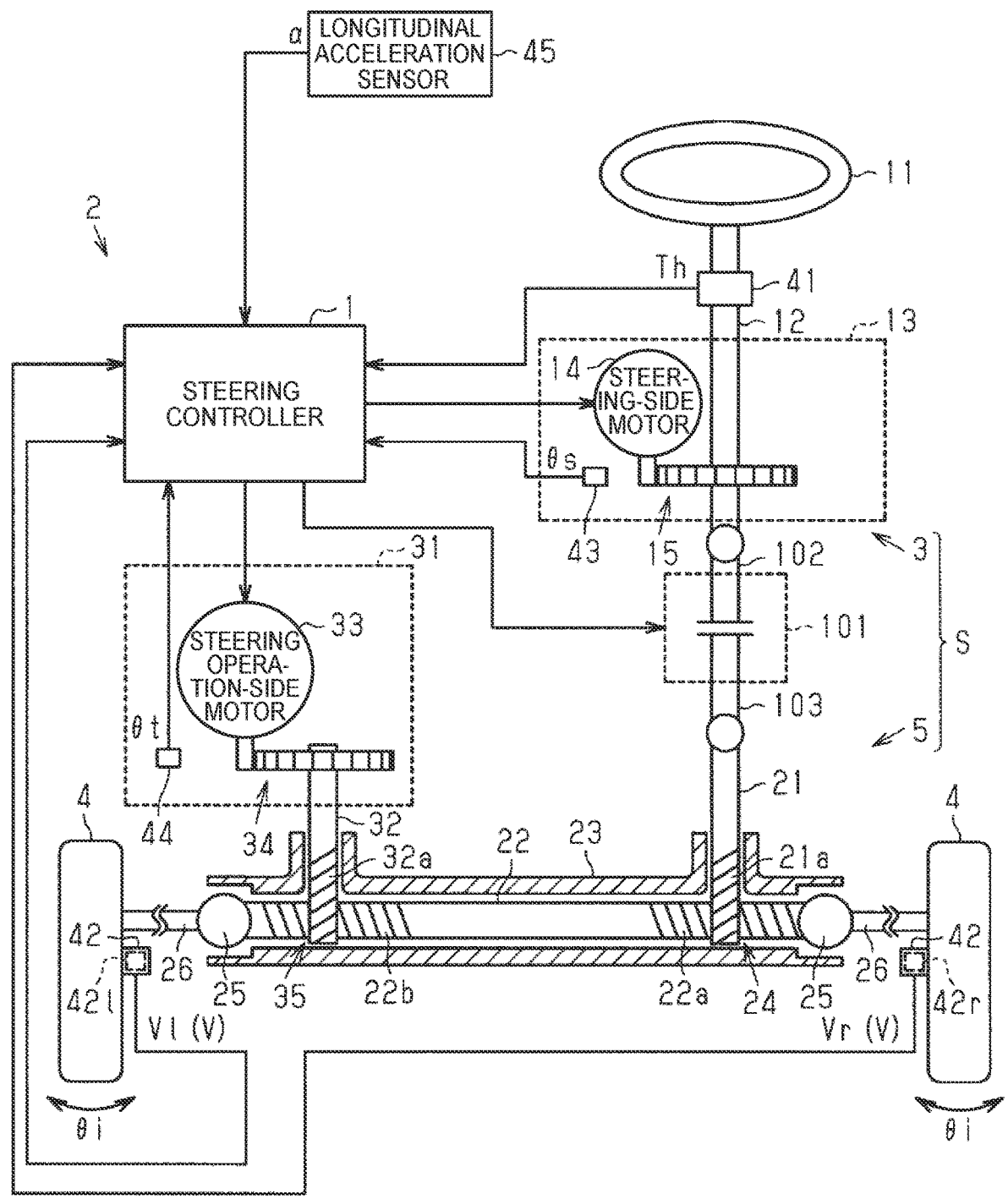
FIG. 9 is a schematic structural diagram of a steer-by-wire type steering system of a modified example.

In an example illustrated in FIG. 9, a clutch 101 is provided between the steering unit 3 and the steering operation unit 5. The clutch 101 is coupled to the steering shaft 12 via an input-side intermediate shaft 102 fixed to an input-side element of the clutch 101, and is coupled to the first pinion shaft 21 via an output-side intermediate shaft 103 fixed to an output-side element of the clutch 101. The steering system 2 is brought into a steer-by-wire mode when the clutch 101 is disengaged in response to a control signal from the steering controller 1. The steering system 2 is brought into an electric power steering mode when the clutch 101 is engaged.

For example, the steering system 2 may be an electric power steering system including a transmission ratio variable apparatus midway along the steering shaft 12 (see, for example, Japanese Patent Application Publication No. 2006-56448). In this case, a motor of the transmission ratio variable apparatus is controlled so that the actual corresponding steered angle θp is the final target corresponding steered angle θp* by adding a difference between the steering angle θh and the transmission ratio correction target corresponding steered angle θa calculated by the variable gear ratio processing unit 81**.

Without changing the transmission ratio of the steering system 2, for example, a braking force of a brake apparatus provided for each wheel may be controlled to change the yaw rate gain and optimize the yaw rate change during the acceleration or deceleration similarly to the embodiments described above.

Next, supplementary description is given of the technical ideas that can be grasped from the embodiments and modified examples described above together with their effects. The variable gear ratio processing unit of the steering controller calculates the transmission ratio correction target corresponding steered angle by making an adjustment so that the transmission ratio increases based on the increase in the absolute value of the value indicating the acceleration or deceleration of the vehicle. According to the configuration described above, the transmission ratio increases (the yaw rate gain decreases) and the yaw rate change decreases when the vehicle is steered while being accelerated or decelerated abruptly. Thus, excellent steering stability can be attained.

The phase compensation calculation unit of the steering controller calculates the phase-compensated component based on the value indicating the acceleration or deceleration of the vehicle so that the phase leads more in the case where the transmission ratio is small than the case where the transmission ratio is large. According to the configuration described above, the yawing response increases when the transmission ratio is small (the yaw rate gain is large) and the yaw rate change is large. Thus, the balance between the yaw rate gain and the yaw rate response can be optimized.

What is claimed is:

1. A controller for a steering system, the steering system being configured such that a transmission ratio between a steering angle of a steering wheel and a steered angle of a steered wheel is variable based on a vehicle speed through actuation of a motor serving as a drive source, the steering wheel being coupled to a steering mechanism, the steered wheel being coupled to a steering operation shaft of the steering mechanism, the controller comprising
   a control circuit configured to calculate a target corresponding steered angle that is a target value of a corresponding steered angle based on the transmission ratio associated with the vehicle speed, the corresponding steered angle being a rotation angle of a rotation shaft, which is convertible to the steered angle whose magnitude is changed relative to a value indicating the steering angle,
   the control circuit being configured to control the actuation of the motor so that an actual corresponding steered angle is a final target corresponding steered angle that is based on the target corresponding steered angle, and
   the control circuit being configured to calculate the target corresponding steered angle by adjusting the transmission ratio based on a value indicating acceleration or deceleration of a vehicle.

2. The controller for the steering system according to claim 1, wherein
   the control circuit is configured to calculate a phase-compensated component by performing phase compensation for the value indicating the steering angle,
   the control circuit is configured to calculate the final target corresponding steered angle based on the target corresponding steered angle and the phase-compensated component, and
   the control circuit is configured to calculate the phase-compensated component by adjusting a phase compensation amount based on the value indicating the acceleration or deceleration of the vehicle.

3. The controller for the steering system according to claim 1, wherein the value indicating the acceleration or deceleration of the vehicle is any one of a longitudinal acceleration of the vehicle, a vehicle speed change amount, and a longitudinal load to be applied to the steered wheel in a longitudinal direction of the vehicle.

4. A method for controlling a steering system, the steering system including a control circuit and being configured such that a transmission ratio between a steering angle of a steering wheel and a steered angle of a steered wheel is variable based on a vehicle speed through actuation of a motor serving as a drive source, the steering wheel being coupled to a steering mechanism, the steered wheel being coupled to a steering operation shaft of the steering mechanism, the method comprising:
- calculating, by the control circuit, a target corresponding steered angle that is a target value of a corresponding steered angle based on the transmission ratio associated with the vehicle speed, the corresponding steered angle being a rotation angle of a rotation shaft, which is convertible to the steered angle whose magnitude is changed relative to a value indicating the steering angle;
- controlling, by the control circuit, the actuation of the motor so that an actual corresponding steered angle is a final target corresponding steered angle that is based on the target corresponding steered angle; and
- calculating, by the control circuit, the target corresponding steered angle by adjusting the transmission ratio based on a value indicating acceleration or deceleration of a vehicle.

\* \* \* \* \*